United States Patent
Reece

[11] 3,888,327
[45] June 10, 1975

[54] VEHICLE RADIATOR PROTECTION DEVICE

[76] Inventor: Vernon N. Reece, Rt. 3, Box 443-C, De Queen, Ark. 71832

[22] Filed: Jan. 30, 1974

[21] Appl. No.: 427,689

[52] U.S. Cl. ............................................. 180/68 P
[51] Int. Cl. ......................................... B60k 11/04
[58] Field of Search..... 180/68 P, 68 R, 69 R, 69 C, 180/54 A

[56] References Cited
UNITED STATES PATENTS

| | | | |
|---|---|---|---|
| 1,306,364 | 6/1919 | Warman | 180/68 R |
| 1,388,908 | 8/1921 | Wilson | 180/68 R |
| 1,399,859 | 12/1921 | Garver | 180/68 R |
| 1,429,039 | 9/1922 | Kloepper | 180/68 R |
| 1,431,595 | 10/1922 | Peacock | 180/68 R |
| 1,435,345 | 11/1922 | Stewart | 180/68 R |
| 1,449,322 | 3/1923 | Hermann | 180/68 R |
| 1,791,841 | 2/1931 | Radford | 180/68 P |
| 1,982,293 | 11/1934 | Green | 180/68 P |
| 2,397,809 | 4/1946 | Roeder et al. | 180/54 A UX |

*Primary Examiner*—David Schonberg
*Assistant Examiner*—Milton L. Smith

[57] ABSTRACT

A radiator protection device for protecting a vehicle radiator from damage due to tree limbs and other protruding objects while freely allowing air to pass through. The said device comprises a plurality of mutually parallel spaced convex deflector bars and a plurality of concave stopping bars which may be constructed as a separate unit to fit existing vehicles or constructed as an integral part of a vehicle radiator system.

7 Claims, 4 Drawing Figures

VEHICLE RADIATOR PROTECTION DEVICE

BACKGROUND OF THE INVENTION

1. Field of the Invention

The present invention relates to radiator protection devices and more particularly, but not by way of limitation to a protection device for land clearing vehicles such as bulldozers and the like.

2. Description of the Prior Art

Bulldozers and other similar devices are used for many varied purposes, not the least of which is for clearing wooded land for highway or other construction projects. However, most of these vehicles are primarily equipped for the purpose of earth moving projects and for operations in the proximity of other vehicles. Their radiator protection equipment consists of heavy steel plates having a plurality of spaced air holes therethrough. This protection plate is adequate for preventing large objects from damaging the vehicle radiator but is totally inadequate for preventing long slender protruding objects such as tree limbs and branches from passing through the air holes in the radiator protector and causing great damage to the radiator.

When the vehicle radiator is damaged due to branches and the like, there is loss, not only due to the high cost of repair of the radiator, but also due to the vehicle downtime while it is being repaired. Many times the loss of use of a commercial vehicle due to repairs far exceeds the actual cost of the repair itself.

SUMMARY OF THE INVENTION

The present invention provides a vehicle radiator protection device which is particularly designed and constructed to overcome the above disadvantages.

The present invention provides a novel radiator protection device which prevents the vehicle radiator from being punctured by protruding objects such as tree limbs and branches while still allowing sufficient air flow therethrough to provide the necessary cooling for the vehicle engine. The present device also provides the necessary protection from damage due to large objects and, therefore, serves as a complete replacement for the existing radiator protectors now utilized on heavy equipment. This is significant because many strictly earth moving operations and material handling operations bring the vehicles in the proximity of elongated slender reinforcement steel rods and the like which would cause even more damage than the more brittle tree limbs.

The present device generally comprises a plurality of spaced deflector bars placed over the radiator intake or exhaust air opening adjacent to the radiator. Each of the deflector bars is provided with an outwardly facing convex cross sectional shape for deflecting the protruding branches or the like. A plurality of spaced stopping bars are disposed between the deflector bars and the radiator and are spaced from the deflector bars, one said stopping bar being disposed adjacent to the gap or space between the deflector bars.

Further, each said stopping bar is provided with an outwardly facing concave cross-sectional shape which serves to turn or bend the limbs or branches which enter through the spaces between the deflector bars thus causing the said branches to break into short harmless pieces without having caused any damages to the vehicle radiator.

DESCRIPTION OF THE DRAWINGS

Other and further advantageous features of the present invention will hereinafter more fully appear in connection with a detailed description of the drawings in which.

DETAILED DESCRIPTION OF THE DRAWING

Figure 1:
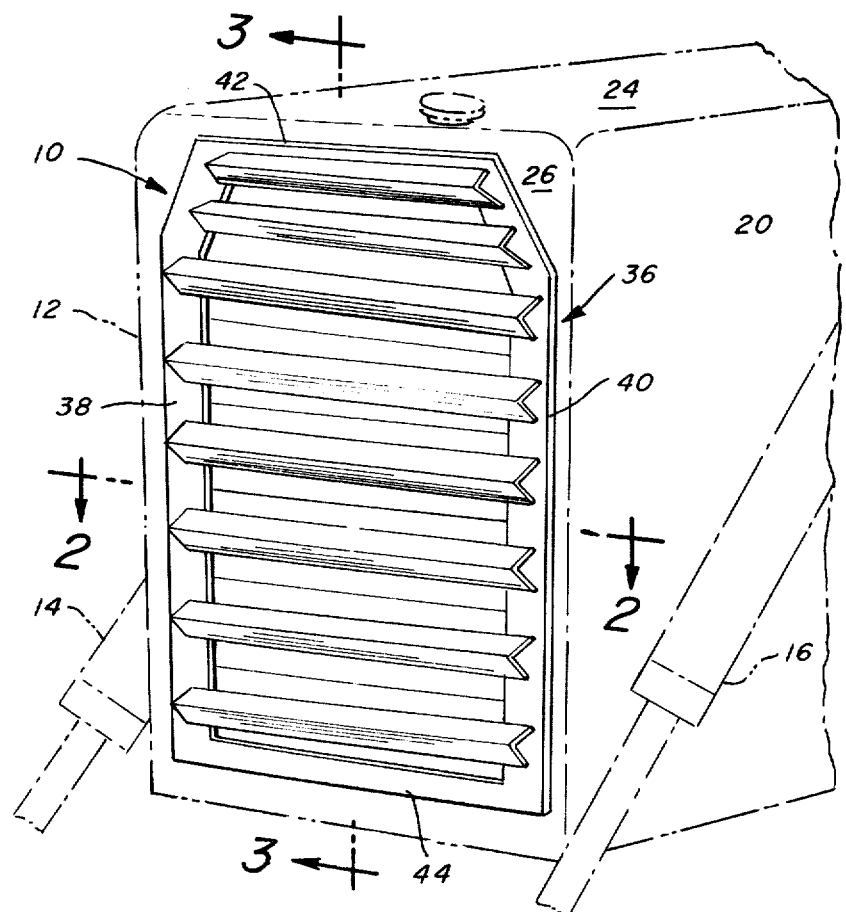
FIG. 1 is a perspective view of the radiator section of the vehicle equipped with a protection device embodying the present invention.
Figure 2:
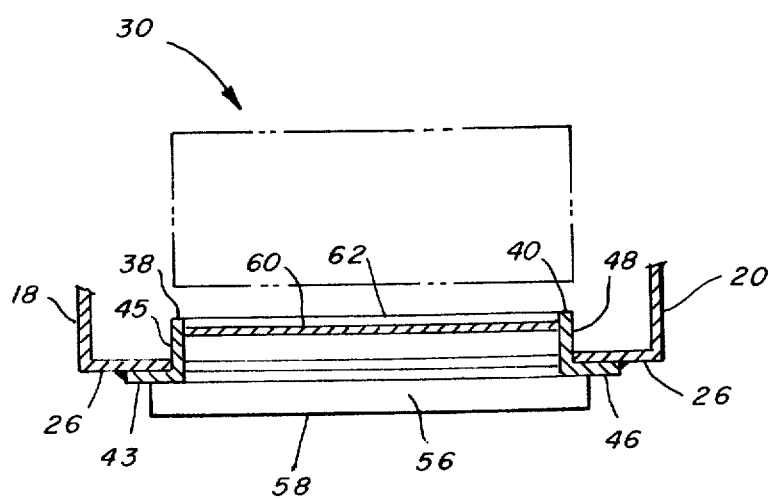
FIG. 2 is a top cross sectional view of the protection device of FIG. 1 taken along the broken lines 2—2 of FIG. 1.
Figure 4:
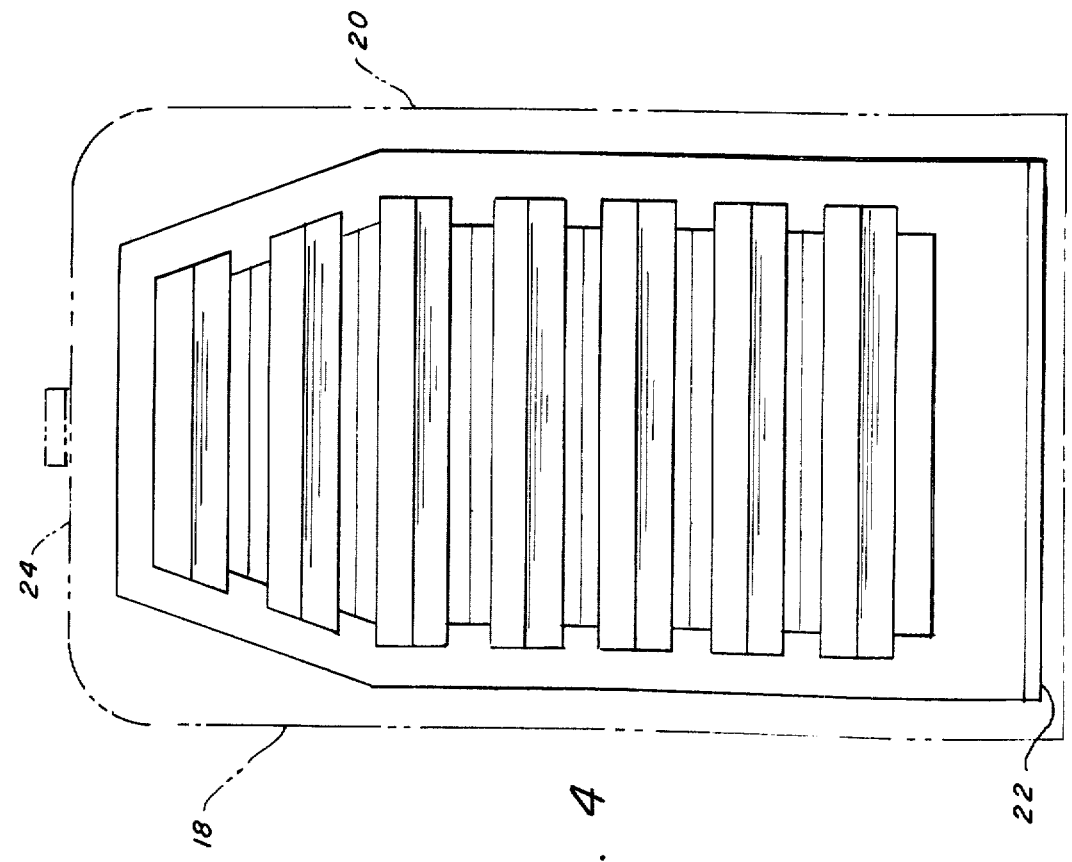
FIG. 4 is a front elevational view of the protection device of FIG. 1.
Figure 3:
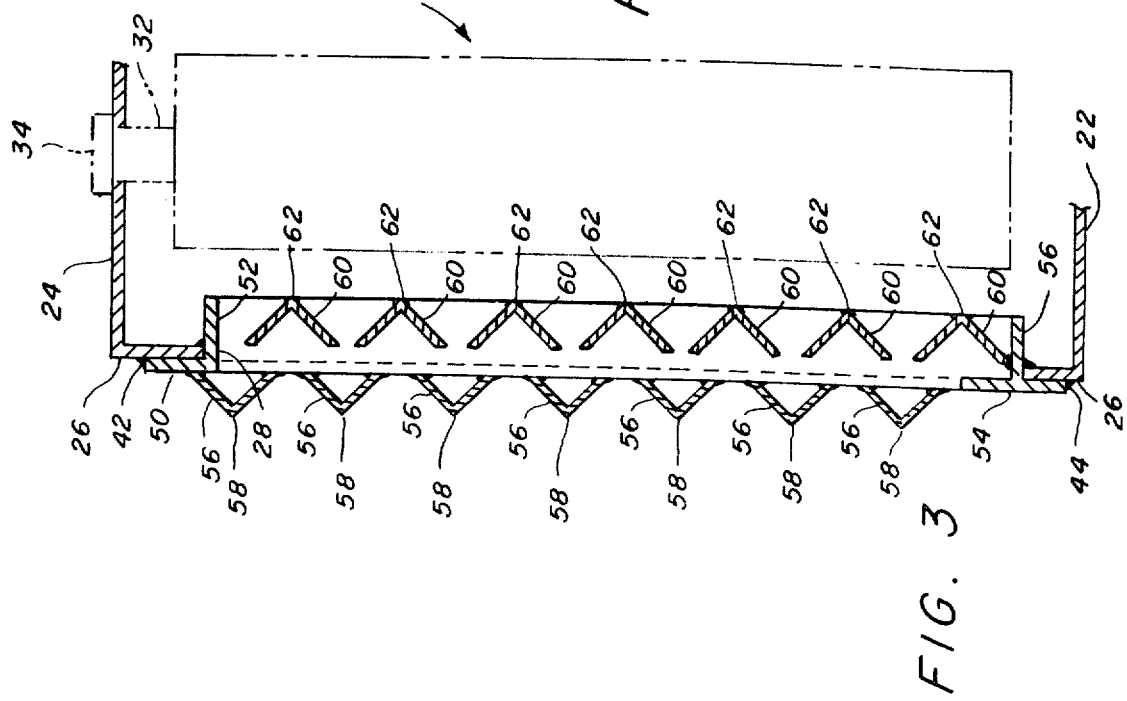
FIG. 3 is a side elevational sectional view of the protection device of FIG. 1 taken along the broken lines 3—3 of FIG. 1.

Referring to the drawings in detail, reference character 10 generally indicates a radiator protection device which is installed on the radiator housing 12 of an earth moving or clearing vehicle. Most such vehicles are equipped with a front blade or scraper (not shown) which is operated by hydraulic jacks such as those indicated by reference characters 14 and 16.

The particular embodiment shown depicts a radiator protection device 10 which is made an installable unit to replace existing radiator protection devices on vehicles already constructed. However, it is again pointed out that the protection device may be made as an integral part of the radiator protection housing 12 when the vehicle is manufactured and the differences in construction will be hereinafter pointed out.

The radiator housing 12 is generally box-shaped having oppositely disposed side walls 18 and 20, a bottom panel 22 and a top panel 24. A front panel 26 having an air opening aperture 28 is secured to the front edges of the side panels 18 and 20 and the bottom and top panel 22 and 24 respectively. The housing 12 therefore surrounds the vehicle radiator generally indicated by reference character 30 which has a fill spout 32 connected at the upper end thereof. The fill spout 32 extends upwardly through the top panel and is provided with a suitable cap 34. It is noted that the detailed configuration of the radiator 30 with its connecting hose, drains, spigots and the like is not shown in detail since the exact configuration thereof is not pertinent to this invention. It is further pointed out that the radiator 30 and its housing 12 may extend from any direction away from the vehicle but for ease of description in this application the front or forward end will be designated as that portion of the housing 12 having the air vent opening 28 therein.

The radiator protection device 10 comprises a frame assembly 36 which completely surrounds the air vent opening 28 and is rigidly secured thereto. The frame 36 may be constructed, as shown in the drawings attached hereto from a plurality of angle irons or T-shaped irons comprising a substantially vertically disposed side frame member 38, an oppositely disposed vertical side frame member 40 and a horizontally disposed top frame member 42 and a second horizontally disposed bottom frame member 44. The frame member 42 is rigidly secured between the upper ends of the side frames 38 and 40 by any well known manner such as welding and likewise the bottom frame member 44 is secured between the lower ends of the side frame members 38 and 40 in a like manner. In this particular embodiment the side frame members 38 and 40 are shown as angling inwardly near the top portion thereof in order to fit the particular configuration of the opening 28 in the radiator housing 12. However, this frame member may be configured to fit substantially any shaped air vent opening for a particular vehicle.

The vertically disposed side frame members 38 and 40 are constructed from 90° angle iron, one outwardly extending leg 43 of the angle iron 38 constituting the front face of the frame member 38 and the second leg 45 thereof extending rearwardly therefrom. The leg 43 is secured directly to the front panel of the housing 26 by any well known manner such as by welding. Likewise, the frame member 40 has one outwardly extending leg 46 and the other leg 48 extending rearwardly therefrom, the leg 46 being attached to the front panel 26 of the radiator housing 12 by any well known manner such as by welding. The top frame member 42 is likewise constructed of 90 degree angle iron, one leg thereof being upwardly extending and indicated by reference character 50, the other leg 52 thereof extending rearwardly therefrom. The leg 50 is secured to the front panel 26 by any well known manner such as by welding. The bottom frame member 44 is constructed of an elongated T section material which provides a front face section 54 and a rearwardly extending leg member 56. The front face member 54 is likewise secured to the front panel member 26 by means of welding or the like.

A plurality of vertically spaced horizontally disposed deflector bars 56 are secured across the frame assembly 36 each end of each deflector bar 56 being welded to the front faces 43 and 46 of the side frame members 38 and 40, respectively.

These deflector bars are arranged to be mutually parallel and are normally provided with equal spacing therebetween. The deflector bars 56 shown in the drawings are constructed from 90 degree angle iron with the apex line 58 of each bar facing forwardly or outwardly away from the radiator 30. The deflector bars 56 as shown herein need not be constructed from angle iron but may be configured with any cross sectional shape so long as the outer forward face thereof is convex in cross sectional shape. Therefore, a deflector bar having a curved cross sectional shape could be readily used instead of the angle iron deflector bars as shown in the drawings.

A plurality of horizontally disposed vertically spaced stopping bars 60 are disposed between the rearwardly extending legs 45 and 48 of the side frame members 38 and 40, respectively, and rigidly secured thereto at each end thereof by means of welding and the like. These stopping bars 60 are also depicted as being constructed from 90 degree angle iron material having the apex 62 thereof extending rearwardly or toward the radiator 30. Therefore, the front or forward face of each stopping bar 60 is convex in cross sectional shape and each said stopping bar 60 is disposed in horizontal alignment with the spaces between the deflecting bars 56. Again, the cross sectional shape of the stopping bars need not be angular in construction so long as the front or forward face thereof is concave in shape. Therefore, bars having a curved cross sectional shape may be used instead of the angle irons as shown in the drawings. It is also desirable that the stopping bar 60 be spaced rearwardly from the deflecting bars 56 in order to provide sufficient space for air to enter the space between the deflector bars 56 to travel around and through the spaces provided between the stopping bars 60.

Tree limbs, branches or other elongated protruding objects that encounter the deflector bars 56 may then pass through the spaces between said deflector bars 56 but will then be caught by the stopping bars 60. It has been found that such tree limbs are then bent or broken by the stopping bars 60 into harmless twigs and are thereby prevented from encountering the radiator 30 and doing damage thereto.

It is also apparent from the foregoing that the deflector bars 56 and the stopping bars 60 need not be horizontally arranged but may be vertically arranged or set at any desired angle so long as the deflector bars 56 and the stopping bars 60 are mutually parallel and arranged with respect to each other as hereinbefore described.

One other way of constructing the radiator protection device would be to simply weld the deflector bars 56 directly to the front of the front plate 26 and the stopping bars to the rear face of the said front plate 26. This would eliminate the frame assembly 36.

From the foregoing it is readily apparent that the present invention provides a radiator protection device for protecting a vehicle radiator from damage due to tree limbs and other protruding objects while freely allowing air to pass therethrough.

Whereas, the present invention has been described in relation to the drawings attached hereto, it is obvious that other and further modifications apart from those shown or suggested herein may be made within the spirit and scope of this invention.

What is claimed:

1. A vehicle radiator protection device for protecting a vehicle radiator from protruding objects through the radiator air opening while freely allowing air to pass through, said device comprising a plurality of spaced, elongated deflector bars secured across the outer surface of the air opening, the outer surface of each said deflector bar being convex in cross sectional shape and a plurality of spaced elongated stopping bars secured across the inside surface of the air opening between said deflector bars and the vehicle radiator, one said stopping bar being positioned in substantial alignment with each space between adjacent deflector bars, the outer surface of each said stopping bar being concave in cross sectional shape.

2. A vehicle radiator protection device as set forth in claim 1 wherein the deflector bars and the stopping bars are oriented to be mutually parallel.

3. A vehicle radiator protection device as set forth in claim 1 wherein the stopping bars are spaced inwardly from the deflector bars.

4. A vehicle radiator protection device as set forth in claim 1 wherein the convex surface of the deflector bars are substantially V-shaped with the apex extending outwardly from the radiator and the stopping bars are substantially V-shaped with the apex thereof extending inwardly toward the vehicle radiator.

5. A vehicle radiator protection device for protecting a vehicle radiator from tree limbs and other protruding objects while freely allowing air to pass through, said device comprising frame means surrounding the radiator air opening and secured thereto, a plurality of spaced elongated deflector bars secured across the outer surface of the frame means, the outer surface of each deflector bar being convex in shape and a plurality of spaced elongated stopping bars secured across the inside surface of the frame means and spaced from the deflector bars, one stopping bar being positioned in substantial alignment with each space between adjacent deflector bars and spaced therefrom, the outer surface of each said stopping bar being concave in cross sectional shape.

6. A vehicle radiator protection device as set forth in claim 5 wherein the deflector bars and the stopping bars are oriented to be mutually parallel.

7. A vehicle radiator protection device as set forth in claim 5 wherein the convex surface of the deflector bars are substantially V-shaped with the apex extending outwardly from the radiator and the said stopping bars are substantially V-shaped with the apex thereof extending inwardly toward the vehicle radiator.

* * * * *